Dec. 15, 1953      G. E. FLINN      2,662,418
TRANSMISSION CONTROL
Filed May 26, 1948
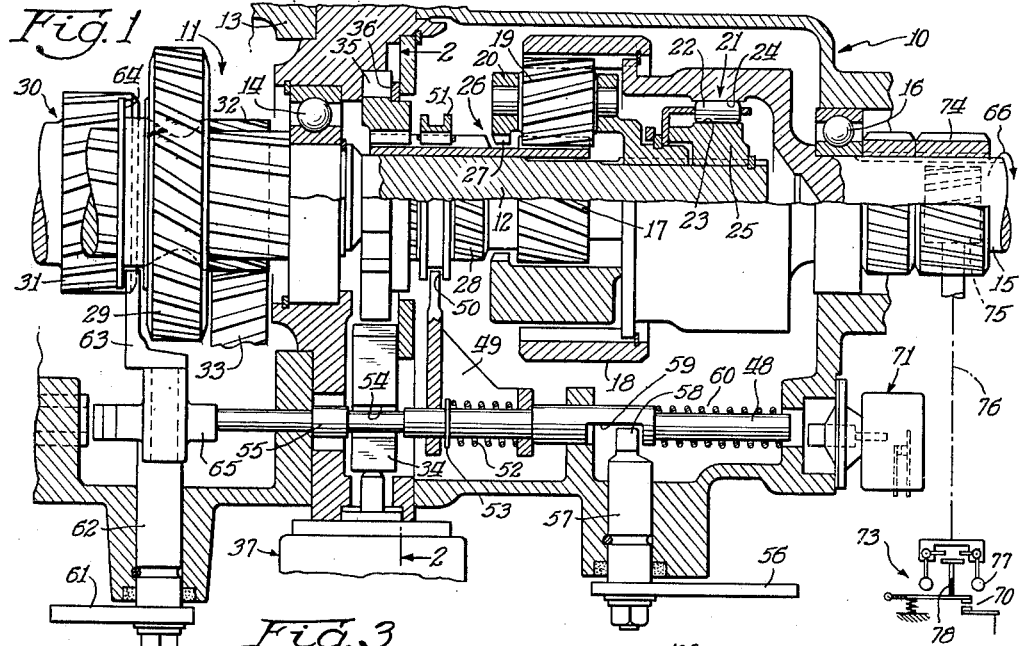
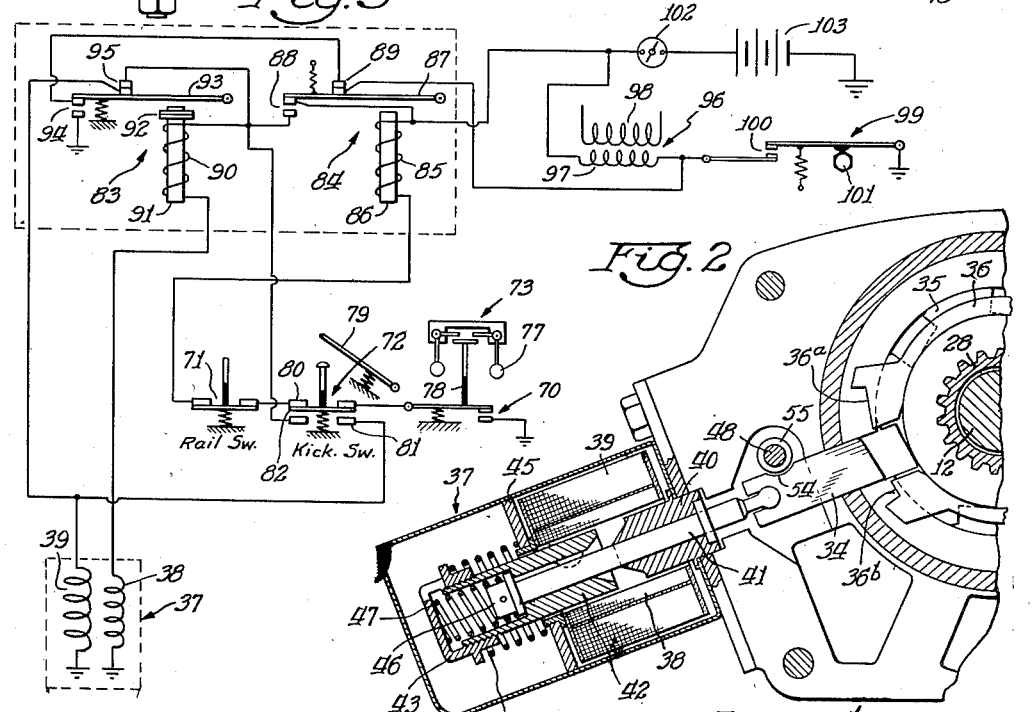
Inventor:
George E. Flinn Patented Dec. 15, 1953

2,662,418

UNITED STATES PATENT OFFICE 2,662,418

TRANSMISSION CONTROL

George E. Flinn, Muncie, Ind., assignor to Borg-Warner Corporation, Chicago, Ill., a corporation of Illinois Application May 26, 1948, Serial No. 29,270

3 Claims. (Cl. 74—472)

My invention relates to transmissions for automotive vehicles and more particularly to such transmissions of the planetary gear type known as overdrives.

Overdrives in common use at present generally contain an electric solenoid for actuating the pawl of a positive brake for an element of the planetary gear set in the transmission. The solenoid contains an energizing coil and a holding coil which are both energized for moving the pawl into its energized position which is generally a brake engaged position. The energizing coil draws a current which is comparatively large with respect to that taken by the holding coil, and the energizing coil is therefore deenergized by the opening of a switch when the pawl reaches its energized position, in which position it is held by means of the holding coil alone. This switch is located within the solenoid and is actuated by means of the pawl.

Such overdrives also generally include means for disabling the ignition system of the vehicle engine which comprises a switch that is actuated when the pawl reaches its engaged position for terminating the ignition disablement. This switch is also located within the solenoid.

It has been found in actual usage that these switches rust and oxidize excessively and also cause rusting and oxidation within the solenoid apart from the switches themselves, this oxidation and rusting principally being due to the electrolytic action of the switch contacts. Overdrives are generally located on the underside of the vehicle, and the solenoids are thus subject to moist conditions due to splashing, and hence this electrolytic action.

It is an object of my invention to provide an electric control system for such an overdrive which does not include any contacts located within the solenoid itself and actuated by the pawl and to instead provide switches for performing the functions of the two switches just mentioned which may be placed within the engine compartment of the vehicle or in any other location which will be relatively dry compared to the underside of the vehicle.

It is a more specific object of the invention to provide such an improved electrical control system for overdrives which includes a delay relay. The delay relay may actuate two switches, one being in series with the energizing coil of the solenoid and opening a circuit through its energizing coil a predetermined time after energization of both the solenoid and delay relay, which time is sufficient for allowing the full travel of the pawl. The other switch may be in an ignition interrupting circuit and actuated a predetermined time after deenergization of the delay relay, so that the ignition is restored to normal operation in such predetermined time, which time is sufficient for the pawl to be pulled out of its engaged position without the thrust of the parts of the positive brake preventing such a pull-out of the pawl.

It is a more particular object of the invention to so arrange the circuits in connection with the delay relay so that the holding coil and the energizing coil of the solenoid hereinabove referred to are connected in series with the coil of the delay relay when the delay relay is being deenergized. The effect of so connecting the coils of the solenoid is to lengthen the delay after which the relay is completely deenergized to actuate the ignition interrupting switch. By such lengthening of the deenergization period of the relay, more time is allowed for the pawl to move into its brake disengaged position.

My invention consists of the novel constructions, arrangements and devices to be hereinafter described and claimed for carrying out the above stated objects and such other objects as will appear from the following description of a preferred embodiment of the invention which is illustrated with reference to the accompanying drawing in which:

Fig. 1 is a fragmentary, longitudinal, sectional view of an overdrive transmission attached to an ordinary three speed countershaft type transmission, with which overdrive my improved control arrangement may be used;

Fig. 2 is a sectional view taken on line 2—2 of Fig. 1 in the direction indicated; and Fig. 3 is an electrical diagram of a control system for the overdrive shown in Figs. 1 and 2 and embodying principles of the invention.

For further details of the countershaft and overdrive transmission units, the co-pending application of Charles Harrison, Serial No. 28,718, filed May 22, 1948, may be referred to.

Like characters of reference designate like parts in the several views.

Referring now in particular to Fig. 1 of the drawing, the illustrated transmission arrangement comprises a planetary overdrive unit 10 and a countershaft type unit 11 which is shown only fragmentarily. The planetary overdrive unit comprises a drive shaft 12 rotatably disposed within the transmission casing 13 by means of a bearing 14 and a driven shaft 15 rotatably disposed in the casing 13 by means of a bearing 16.

The drive shaft 12 is driven by the countershaft unit 11 which will hereinafter be described in greater detail, and the driven shaft 15 is adapted to be connected to the driving wheels (not shown) of the vehicle by any suitable connections.

The gear set in the overdrive unit 10 comprises a sun gear 17, a ring gear 18, planet gears 19 (one being shown in the drawing) and a carrier 20 on which the planet gears 19 are rotatably disposed. The sun gear 17 is rotatably disposed on the drive shaft 12; the ring gear 18 is connected with the driven shaft 15; the planet gears 19 are in mesh both with the sun gear 17 and with the ring gear 18; and the planet gear carrier 20 is splined on to the drive shaft 12, as shown.

A one-way clutch 21 is provided between the shafts 12 and 15. The clutch comprises rollers 22 disposed between inner and outer cammed surfaces 23 and 24 located respectively on the outer surface of a hub member 25 splined on to the shaft 12 and within a central cavity in the driven shaft 15.

A positive type clutch 26 is provided to connect the carrier 20 and the sun gear 17. The clutch 26 comprises clutch teeth 27 provided on the carrier 20 and teeth 28 formed on the sun gear 17. The sun gear 17 may be shifted longitudinally of the shaft 12 to engage the teeth 28 with the teeth 27 as is apparent.

The countershaft unit 11 comprises a gear 29 splined on the shaft 12 which constitutes the driven shaft of the unit 11. A countershaft cluster gear 30 is rotatably disposed within the transmission casing 13, and the gear 30 includes gears 31 and 32. An idler gear 33 is rotatably disposed within the casing 13 and is permanently in mesh with the gear 32. The gear 29 is shiftable on the shaft 12 into mesh either with the gear 31 or with the gear 33. It will be understood that the countershaft unit 11 includes other mechanisms for driving its driven shaft 12 at various speed ratios with respect to a drive shaft (not shown) of the countershaft unit; however, since details of such countershaft units are well known and are shown in the before mentioned copending application, Serial No. 28,718, for example, I do not consider the illustration of such details necessary for a full explanation of my invention.

A positive brake is provided for the sun gear 17 of the planetary gear set. The brake comprises a pawl 34 which is rotationally fixed with respect to the transmission casing 13 and is movable into engagement with a slotted element 35 fixed on the sun gear 17. A pawl blocker 36 provided with blocking ledges 36a and 36b is disposed in frictional contact with the slotted element 35 so as to be oscillated in and out of blocking position by rotation of the slotted element.

The pawl 34 is actuated by means of an electric solenoid 37 which comprises a holding coil 38 and an energizing coil 39. The coils are disposed about a core 40, and a plunger 41 is slidably disposed in and extends through the core 40 and is connected with the pawl 34.

A solenoid armature 42 is fixed to the plunger 41, and a hat-like element 43 is screwed on to the armature 42 at its outer end. A spring 44 is disposed between the element 43 and a portion of the casing 45 of the solenoid 37 and functions to yieldably hold the armature 42 in the position in which it is illustrated. A cap-like element 46 is pinned on the outer end of the plunger 41, and a spring 47 is provided within the hat-like element 43 and extends between this element and the element 46, as shown.

A shift rail 48 is provided for shifting the sun gear 17. A shift fork 49 is provided on the rail 48 and extends into a circumferential groove 50 provided in an annular element 51 fixed on the sun gear 17. The shift fork 49 has a lost motion connection with the rail 48 which is provided by a spring 52 disposed between the fork and a spring washer 53 fixed on the rail.

An interlock is provided between the rail 48 and the pawl 34 which comprises a groove 54 formed in the pawl and a land 55 formed on the shift rail and adapted to enter the groove when the rail is shifted to the right as seen in the drawing. A shift lever 56 is provided on the exterior of the transmission for shifting the rail 48 for engaging the clutch 26 and locking the pawl 34 against movement by means of the land 55 and groove 54. The lever 56 is fixed on a shaft 57 rotatably disposed in the transmission casing 13 and carrying a lug portion 58 which is eccentric with respect to the shaft and is disposed in a slot 59 formed in the rail 48. The eccentric arrangement of the lug portion 58 is such that when the lever 56 is swung, the lug portion coacts with an end of the slot 59 to move the rail 48 in the direction to engage the clutch 26. A spring 60 is provided between a shoulder portion on the rail 48 and the transmission casing 13 for yieldably holding the shift rail 48 in its illustrated position corresponding to disengaged condition of the positive clutch 26.

The gear 29 in the countershaft unit 11 is shifted by means of a shift lever 61 located exteriorly of the transmission. The shift lever is fixed on a shaft 62 rotatably disposed in the transmission casing 13 which carries on its inner end a shift fork 63 that fits in a groove 64 provided in the gear 29. The shift fork 63 is eccentrically disposed with respect to the shaft 62 so that swinging movement of the lever 61 and shaft 62 will shift the gear 29 in either direction. The shaft 62 is provided with a cam portion 65 which is so shaped that when the gear 29 is shifted into engagement with the idler gear 33, the shaft 48 is shifted by the cam portion 65 to the right as seen in the drawing against the action of the spring 60.

In the operation of the countershaft unit 11, the shaft 12 which constitutes the driven shaft of the unit is driven at a plurality of speed ratios in the forward direction or else in the reverse direction with respect to a drive shaft of the unit (not shown). The gear 29 is shifted either in one direction or the other by swinging movement of the exterior shift lever 61, as has been described. The gear 29 when moved into mesh with the gear 31 completes a forward drive power train to the shaft 12, and when the gear 29 is shifted in the opposite direction to mesh with the idler gear 33, the shaft 12 is driven in the reverse direction. The terms forward and reverse are used in this connection in the sense that forward rotation of the shafts 12 and 15 causes forward movement of the vehicle and reverse rotation of the shafts causes reverse movement of the vehicle, and the forward direction of rotation may be taken as indicated by the arrow 66.

When the shaft 12 is driven in the forward direction, the one-way clutch 21 engages to complete a drive between the shafts 12 and 15, and as will be understood, the shafts 12 and 15 rotate at the same speed. An overdrive speed ratio may be provided through the overdrive gear unit 10 and between the shafts 12 and 15 by engaging the pawl 34 to hold the sun gear 17 stationary. In order to engage the pawl the two solenoid coils 38 and 39 are energized so as to draw the armature 42 within the solenoid against the action of the springs 44 and 47. The spring 47 acts by means of the element 46 on the plunger 41 and pawl 34 to move the pawl toward the slotted element 35, and engagement of the pawl 34 with the slotted element 35 is prevented due to the blocker 36 until the speed of the sun gear 17 and the slotted element 35 has been brought to zero and they have been given a slight rotation in the reverse direction. The blocker 36, when the drive is through the one-way clutch 21, tends to rotate in the forward direction along with the other parts of the planetary gear set, and the blocker 36 under these conditions has its blocking surface 36a in the path of movement of the pawl 34 and blocks engaging movement of the pawl. In order to reduce the speed of the slotted element 35 and finally reverse its direction of rotation, the driven shaft 15 is allowed to overrun the shaft 12 so as to disengage the one-way clutch 21. Upon such reversal of rotation of the slotted element 35, the blocker 36 is moved, due to its frictional contact with the slotted element, out of its blocking position to allow engagement of the pawl 34 with the slotted element. The planetary gear set 10 is then in overdrive condition, and the ring gear 18 and driven shaft 15 are rotated at an overdrive speed with respect to the shaft 12.

The overdrive gear unit 10 may be locked in a one to one drive by manipulation of the shift lever 56 to engage the clutch 26. The lever 56 is swung to move the shaft 40 rearwardly, so as to move the sun gear 17 in the same direction to engage the teeth 27 and 28, and upon such engagement, all the parts of the planet gear set are locked together so as to provide a two way direct drive between the shafts 12 and 15. Such movement of the shift rail 48, incidentally, also has the function of bringing the land 55 formed on the rail into the slot 54 in the pawl 34 so as to lock the pawl from any movement to engage with the slotted element 35. Such a movement of the shift rail 48 to cause engagement of the positive clutch 26 is also caused by a movement of the gear 29 in the countershaft unit 11 to its reverse drive position in which it is in mesh with the idler gear 33. A two-way direct drive must exist between the shafts 12 and 15 for reverse drive from the countershaft unit 11, due to the fact that the one-way clutch 21 cannot transmit a drive from the shaft 12 to the shaft 15 in the reverse direction.

The transmission arrangement (exclusive of any electrical controls) hereinbefore described is quite similar to such arrangements which have been in use for some time, and I deem as the principal feature of my invention the provision of an electric control system for such a transmission arrangement which utilizes a solenoid 37 as is shown which does not include any electric switches within the solenoid itself. This electrical control system will now be described.

Referring now in particular to Fig. 3, the electric control system for the solenoid 37 comprises a governor switch 70, a rail switch 71 and a kickdown switch 72. The governor switch 70 is a part of a centrifugal governor 73 which is driven from the shaft 15 by gears 74 and 75 and a suitable power transmitting means such as a shaft 76. The governor 73 may be of any suitable type and may comprise weights 77 which when moved outwardly under the influence of centrifugal force operate on a plunger 78 to close the switch 70.

The rail switch 71 is positioned to be actuated by the rail 48, and this switch is opened when the rail is moved to a position to engage the clutch teeth 26 and 27. The kickdown switch 72 is adapted to be actuated by the accelerator 79 of the vehicle in which the transmission is installed. The switch 72 comprises a set of contacts 80, a set of contacts 81 and a switch blade 82. The switch 72 is in its illustrated condition closing the contacts 80 for all ordinary driving positions of the accelerator; however, when the accelerator is moved to its wide open throttle position, it is effective in this position to actuate the switch 72 to open the contacts 80 and to close the contacts 81.

The electric control system comprises a relay assembly which includes two relays 83 and 84. The relay 84 comprises a winding 85 disposed on a core 86 and adapted to actuate an armature 87. The relay comprises two sets of contacts 88 and 89, and the armature 87 carries one of the contacts 88 and one of the contacts 89. In the deenergized condition of the relay 84 in which the relay is shown, it will be noted that the contacts 89 are closed and the contacts 88 are open.

The relay 83 comprises a winding 90 on a core 91. The core 91 is provided with a plurality of slugs 92 in the form of washers disposed about the core, and these slugs have the effect of retarding either the increase or decrease of magnetic flux within the core for purposes to be described. The core is effective on an armature 93, and the relay comprises two sets of contacts 94 and 95. The armature 93 carries one of the contacts 94 and one of the contacts 95, and as will be noted by referring to the figure, in the deenergized condition of the relay 93 in which it is illustrated, the contacts 94 are open and the contacts 95 are closed.

The electrical control arrangement includes the ordinary ignition system of an automotive vehicle comprising an induction coil 96 having a primary winding 97, a secondary winding 98 and an interrupter 99. The interrupter comprises a switch 100 which is opened and closed by means of a rotating part 101 for the purpose of producing an interrupted current through the primary winding 97. The primary winding 97 is connected with the equal ignition switch 102 which in turn is connected to the vehicle battery 103.

As will be noted, the switches 70 and 71 and the switch contacts 80 are connected in series with each other and with the winding 85 of the relay 84. The winding 85 is connected with the ignition switch 102 and with the battery 103 as shown. One of the contacts 88 is connected along with the winding 85 to the ignition switch 102, and the other contact 88 is connected to the winding 90 of the relay 83. One of the contacts 89 of the relay 84 is connected to one of the contacts 94 of the relay 83, and the other contact 89 is connected to a point between the primary winding 97 of the ignition induction coil 96 and the switch 100. One of the contacts 95 of the relay 83 is connected with the energizing coil 39 of the solenoid 37, and the other contact 95 is connected with the winding 90 and one of the contacts 88, as shown. One of the contacts 94 is connected with one of the contacts 89 as has been described, and the other contact 94 is grounded. Both of the solenoid coils 38 and 39 are grounded as shown. One of the contacts 81 of the switch 72 is connected to a point between the solenoid coil 39 and one of the contacts 95, and the other contact 81 is connected to a point between one of the contacts 88 and the winding 90.

As has been mentioned, the slugs 92 are provided on the core 91 to retard the building up and decay of magnetic flux in the core 91, and these slugs thus have the effect of providing a delayed actuation of the armature 93 upon current being applied in the winding 90 and of causing a delayed returning of the armature 93 to its deenergized position when current is discontinued through the winding 90. The slugs 92 thus make the relay 83 a delayed action relay. The circuit arrangement which includes the accelerator switch contacts 81 by means of which the solenoid coils 38 and 39 may be connected in series with the winding 90 has an additional effect in delaying the action of the delay relay still further than is provided by the slugs 92 alone, which action will be hereinafter described in greater detail.

When the vehicle is traveling below the critical speed of the governor 73, the condition of the circuits just described is as shown in Fig. 3 with the relays 83 and 84 both being deenergized. When the speed of the vehicle increases so that the governor switch 70 is closed, the circuit through the relay winding 85 is thereby completed to energize the relay 84. This circuit is from the battery 103, through the ignition switch 102, the winding 85, the switch 71, the contacts 80 of the switch 72, and the switch 70. The relay 84 upon being so energized opens its contacts 89 and closes its contacts 88.

Closure of the switch contacts 88 of the relay 84 has the effect of connecting both the solenoid energizing coil 39 and the solenoid holding coil 38 with the battery 103. The energizing coil 39 is connected with the battery through the switch contacts 95, 88 and the ignition switch 102, and the holding coil 38 is connected with the battery through the winding 90, the switch contacts 88 and the ignition switch 102. The two coils 38 and 39 of the solenoid being thus energized cause the solenoid armature 42 to move into its energized position in which the armature is in contact with the solenoid core 40. This movement of the armature 42 is against the action of the springs 44 and 47. The spring 47 is effective on the plunger 41 through the element 46 and thereby moves the pawl 34 into engagement with the balk ring 36. The engine of the vehicle is driving through the countershaft unit 11 and through the one-way clutch 21, and the balk ring 36 is in a position to prevent movement of the pawl into engagement with the slotted element 35. When the accelerator 79 of the vehicle is subsequently released so that the vehicle engine ceases to drive the gearing of the planetary gear set, the planetary gear set is operative so as to cause the sun gear 17 and the slotted element 35 connected therewith to cease rotating and to finally reverse their direction of rotation so as to move the balk ring 36 out of blocking position whereby the pawl 34 may move into engagement with the slotted element 35 under the action of the spring 47. Upon the pawl thus engaging the slotted element, the overdrive power train through the planetary gear set is completed.

Since the winding 90 of the relay 83 is in series with the holding coil 38 of the solenoid 37, the winding 90 is energized at the same time as the coil 38. Due to the delay feature of the relay 83, the core 91 is not completely magnetized immediately upon application of voltage to the relay winding, and for a short period of time the relay 83 remains in its illustrated deenergized condition with the contacts 95 closed and the contacts 94 opened. After the delay period of the relay 83 has expired, the core 91 is fully magnetized, and thereupon the armature 93 of the relay is drawn into its energized position to open the contacts 95 and close the contacts 94. Opening of the contacts 95 breaks the circuit through the energizing winding 39 of the solenoid 37 in series with these contacts, and this coil is thus deenergized. The armature 42 of the solenoid 37 nevertheless remains in its energized position in contact with the core 40 due to the action of the holding coil 38 which remains energized. The delay, incidentally, of the relay 83 is sufficient so that the armature 42 is drawn into its energized position before the relay 83 becomes effective to close the contacts 94 and open the contacts 95. This delay in opening the contacts 95 and closing the contacts 94 furthermore is greater than would be provided by the slugs 92 themselves, inasmuch as the winding 90 is in series with the holding coil 38 of the solenoid 37 which in itself has inductance and thus delays the building up of the current through the winding 90 and coil 38.

When the operator of the vehicle, while the vehicle is traveling in overdrive, wishes to downshift from overdrive to direct drive in the planetary unit 10, he may do so by a depression of the accelerator 79 to its open throttle position. In this position the accelerator opens the contacts 80 of the kickdown switch 72 for thereby opening the circuit through the winding 85 of the relay 84 to deenergize the relay. Upon such deenergization, the relay 84 closes its contacts 89 and opens its contacts 88. The contacts 89 when closed complete an ignition grounding circuit, and this circuit is from ground through the contacts 94 and the contacts 89 to the point between the ignition coil and the interrupter 99 to which one of the contacts 89 is connected. This grounding of the ignition circuit has the effect of disabling the ignition coil so that it does not operate to cause firing of any of the spark plugs (not shown) of the vehicle engine, and the whole ignition system is disabled so that the driving wheels of the vehicle tend to drive the engine of the vehicle rather than vice versa. The opening of the contacts 88 of the relay 84 has the effect of deenergizing the holding coil 38, so that the spring 44 tends to move the armature 42 and thereby the plunger 41 and pawl 34 due to the action on the washer like element 46 back into the deenergized positions of these parts. The grounding of the ignition circuit just described has the effect of temporarily relieving pressure of the slotted element 35 on the pawl 34, this being in effect a torque reversal, and the pawl upon this torque reversal is pulled out of engaged condition with the slotted element. The transmission is then back in direct drive condition with the drive being through the overrunning clutch 21.

With the winding 90 of the relay 83 and the holding coil 38 in series, the holding coil 38 and relay 83 are deenergized simultaneously. The slugs 92 of the relay function to hold the armature 93 of the relay in its energized position in which the contacts 94 are closed for a predetermined time after the contacts 88 have opened. Still additional means are provided, however, for increasing the delay of the relay 83 in opening the contacts 94 and closing the contacts 95, and this comprises the switch arrangement controlled by the accelerator 79, which functions to connect all three windings 38, 39, and 90 in series when the accelerator is moved into its kickdown or open throttle position. When the accelerator is in this position, the switch blade 82 opens the contacts 80 and closes the contacts 81 as has been described, and the contacts 81 when so closed complete a circuit from the solenoid energizing coil 39 through the contacts 81 and winding 90 through the holding coil 38. The inductance of the coils 38 and 39 together with the effect of the armature 42 in moving through these coils to set up an electromotive force in the coils due to this movement have the effect of keeping the relay 83 energized for a greater length of time than would be obtained without the coil 39 being so connected in series with the other two coils 90 and 38. During the delay period in which the contacts 94 are closed, they complete the ignition grounding circuit above described after closing of the contacts 89 upon deenergization of the relay 84, and this time is sufficient to allow the pawl 34 to be pulled out of engagement with the slotted element 35. When the relay 81 is completely deenergized after this delay period has elapsed, then of course the armature 93 moves back to its deenergized position to open the contacts 94 and close the contacts 95, and this opening of the contacts 94 has the effect of breaking the ignition grounding circuit, and the ignition is then again operative so that the engine drives the vehicle even though the accelerator 79 may be kept in its wide open throttle position.

The rail switch 71 is adapted to be acted on by the shift rail 48, and this switch is opened when the rail 48 is moved into its position in which it is effective to engage the clutch 26 for locking up the planetary gear set. The rail switch 71 when opened by the movement of the shift rail functions to prevent an energization of the relay 84 even though the speed of the vehicle increases sufficiently to close the governor switch 70. The rail switch 71 is thus effective to prevent an engagement of the pawl 34 with the slotted element 35 while the clutch 26 is engaged, this being for the purpose of preventing the overdrive gear set from being in two different two-way drives at once which would cause breakage of some of the parts of the gear set.

It will be noticed that the circuit for controlling the overdrive gear set just described does not include any switch contacts within the solenoid 37. In commonly used installations there are at least two sets of such switch contacts within the overdrive solenoids, one set corresponding to the contacts 94 and the other corresponding to the contacts 95. Since the contacts 94 and 95 in my improved arrangement are located in the relay assembly which may be positioned within the vehicle engine compartment or at any other comparatively dry place on the vehicle, corrosion of the contacts in my arrangement will not occur as is quite possible with the ordinary installations in which the contacts are located within the overdrive solenoid. It will be borne in mind that the overdrive solenoids are in general located underneath the vehicle in which position moisture is likely to enter. Another very advantageous feature of the invention is considered to be the arrangement for increasing the delay of the relay 83, compared to that delay which would be provided simply by the slugs 92, on a downshift of the planetary gear set. My improved arrangement includes the switch contacts 81 closed upon a downshifting movement of the accelerator 79 of the vehicle which contacts complete a series circuit including the two solenoid coils 38 and 39 and the relay winding 90, and the delay of the relay is increased due to the inductance of the coils 38 and 39 and also the electromotive force produced by the movement of the armature 42 through these coils upon deenergization of the solenoid 37.

I wish it to be understood that my invention is not to be limited to the specific constructions, arrangements and devices hereinabove described, except only insofar as the claims may be so limited, as it will be understood that changes may be made without departing from the principles of the invention. In the construction of the appended claims, I wish it to be understood that where I specify in the claims an engaging means or a positive engaging means I intend to include by this expression not only a brake as is disclosed in the illustrated embodiment of the invention but also a clutch, a brake being understood to be an engaging means in which one part to be engaged is stationary and a clutch being understood to be an engaging means in which both parts are movable.

I claim:

1. In combination, an electric solenoid comprising a holding coil, an energizing coil and an armature movable within said coils, a delay relay having an energizing winding and a switch, said switch being connected in series with said energizing coil and said winding being connected in series with said holding coil, means for connecting a source of electric current with said energizing winding and said switch whereby to energize said solenoid and said delay relay, said relay being actuated a predetermined time after such energization which is sufficient for movement of said armature in said solenoid whereby to open said switch after which said holding coil remains effective to hold the armature in energized position, and means for connecting said coils and said winding in series on deenergization of said delay relay whereby to increase the time of deactuation of said relay.

2. In combination, an electric solenoid comprising a holding coil, an energizing coil and an armature movable within said coils, spring means for holding said armature yieldingly at least partially without said coils, a delay relay comprising an energizing winding on a core and metal washers on the core for causing the relay to remain actuated a predetermined time after energization of said winding and to remain deactuated a predetermined time after deenergization of said winding, a switch actuated by said delay relay and closed when the relay is deactuated, said switch being connected in series with said energizing coil and the winding of said relay being connected in series with said holding coil, means for connecting a source of electric current with said energizing winding and said switch whereby to energize said solenoid and said delay relay, the delay of actuation of said relay after energization of its said winding being sufficient for movement of said armature in said solenoid to actuated position whereby said switch is opened and said energizing coil is deenergized after said armature has so moved and after which said holding coil remains effective to hold the armature in its actuated position, and means for connecting said coils and said winding in series on deenergization of said delay relay whereby to increase the time of deactuation of said relay.

3. In transmission mechanism for an automotive vehicle having an ignition system, the combination of a drive shaft, a driven shaft, means for providing relatively low and high speed power trains between said shafts, said last-named means including a slotted element and a movable element movable into engagement with the slotted element to complete the high speed power train and allowing the completion of the low speed power train when disengaged from the slotted element, an electric solenoid having an energizing coil and a holding coil and having a movable armature for moving the movable element into and out of engagement with the slotted element, means for interrupting the vehicle ignition system to permit disengagement of the movable element from the slotted element to complete the low speed power train and including an electric switch, a delay relay having an energizing coil connected in series with said holding coil and controlling said switch whereby actuation of the switch is delayed for a time after deenergization of the delay relay, an accelerator for the vehicle, and means controlled by said accelerator and effective upon movement of the accelerator to a kickdown position for deenergizing said delay relay and connecting the energizing coil of said solenoid and the energizing coil of said relay in series with said holding coil for increasing the delay of the relay and actuation of the switch until the movable element has completed a movement out of engagement with the slotted element to complete the low speed power train and due to a resultant electromotive force in said delay relay coil generated by said solenoid coil upon movement of the armature through said solenoid coil during a disengaging movement of the movable element out of engagement with the slotted element.

GEORGE E. FLINN.

References Cited in the file of this patent
UNITED STATES PATENTS

| Number | Name | Date |
|---|---|---|
| 2,257,838 | Claytor | Oct. 7, 1941 |
| 2,267,603 | Claytor | Dec. 23, 1941 |
| 2,281,916 | Claytor | May 5, 1942 |
| 2,283,623 | Claytor | May 19, 1942 |
| 2,306,865 | Claytor | Dec. 29, 1942 |
| 2,319,226 | Griswold | May 18, 1943 |
| 2,319,746 | Orr | May 18, 1943 |
| 2,323,340 | McFarland | July 6, 1943 |
| 2,330,407 | Claytor | Sept. 28, 1943 |
| 2,344,178 | Sparrow | Mar. 14, 1944 |
| 2,350,938 | Sparrow | June 6, 1944 |
| 2,366,254 | Paton | Jan. 2, 1945 |
| 2,375,031 | Orr | May 1, 1945 |
| 2,375,816 | Orr | May 15, 1945 |
| 2,445,561 | Carnagua | July 20, 1948 |